(12) United States Patent
Wojewodzki et al.

(10) Patent No.: US 6,591,918 B1
(45) Date of Patent: Jul. 15, 2003

(54) AGRICULTURAL TRACTOR HITCH

(75) Inventors: Jan J. Wojewodzki, St. Bruno (CA); Edwin Roy Kreis, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/165,570

(22) Filed: Jun. 7, 2002

(51) Int. Cl.[7] .............................................. A01B 59/041
(52) U.S. Cl. ...................................... 172/450; 280/474
(58) Field of Search ................................. 172/450, 449, 172/457, 446, 440, 441; 280/460.1, 461.1, 497, 474

(56) References Cited

U.S. PATENT DOCUMENTS

| | | | |
|---|---|---|---|
| 2,935,147 A | * | 5/1960 | Edman et al. ............... 172/457 |
| 2,987,126 A | * | 6/1961 | Horney ........................ 172/450 |
| 3,047,076 A | | 7/1962 | Wier et al. |
| 3,627,060 A | | 12/1971 | Lemmon |
| 3,635,494 A | * | 1/1972 | Barkstrom et al. ......... 280/462 |
| 3,709,304 A | | 1/1973 | Haupt |
| 3,721,302 A | | 3/1973 | Buchmuller et al. |
| 3,734,195 A | * | 5/1973 | Cantral ........................... 172/7 |
| 3,791,456 A | | 2/1974 | Koch |
| 3,847,228 A | | 11/1974 | Slosiarek et al. |
| 3,888,316 A | | 6/1975 | Azzarello et al. |
| 3,910,355 A | | 10/1975 | Elfes et al. |
| 4,116,458 A | | 9/1978 | Berg |
| 4,216,975 A | * | 8/1980 | Schafer ....................... 172/439 |
| 4,268,057 A | | 5/1981 | Engelmann et al. |
| 4,397,359 A | | 8/1983 | Price et al. |
| 4,470,613 A | | 9/1984 | Sykes |
| 4,519,623 A | | 5/1985 | Orthman |
| 4,601,486 A | | 7/1986 | Marcq |
| 4,640,522 A | | 2/1987 | Teich |
| 4,711,460 A | | 12/1987 | Schmittbetz |
| 4,919,215 A | | 4/1990 | Lee et al. |
| 5,201,539 A | | 4/1993 | Mayfield |
| 5,823,268 A | | 10/1998 | Barnes |
| 6,044,915 A | | 4/2000 | Schlegel et al. |
| 6,065,549 A | * | 5/2000 | Schlegel ...................... 172/450 |
| 6,149,180 A | * | 11/2000 | Haws ....................... 280/479.1 |
| 6,352,123 B1 | * | 3/2002 | Schlegel et al. ............. 172/439 |
| 6,371,217 B1 | | 4/2002 | Boden |

FOREIGN PATENT DOCUMENTS

| | | |
|---|---|---|
| EP | 0 315 594 | 10/1989 |
| EP | 1116431 A1 * | 7/2001 |
| GB | 906815 | 9/1962 |

* cited by examiner

Primary Examiner—Victor Batson

(57) ABSTRACT

A draft link of an agricultural tractor three-point hitch has a recessed pocket on the inside surface thereof. The recessed pocket has a convex back wall surface with a center of curvature. A bumper is disposed in the pocket and has a concave inner surface complementary to the convex back wall surface of the pocket. The convex outer surface of the bumper is eccentric to the convex back wall surface of the pocket resulting in a wedge shaped bumper. The bumper is rotatable in the pocket about the center of curvature. The position of the bumper in the pocket determines the extent to which the eccentric outer surface projects from the pocket. This projection determines the amount of lateral sway of the draft link.

2 Claims, 4 Drawing Sheets

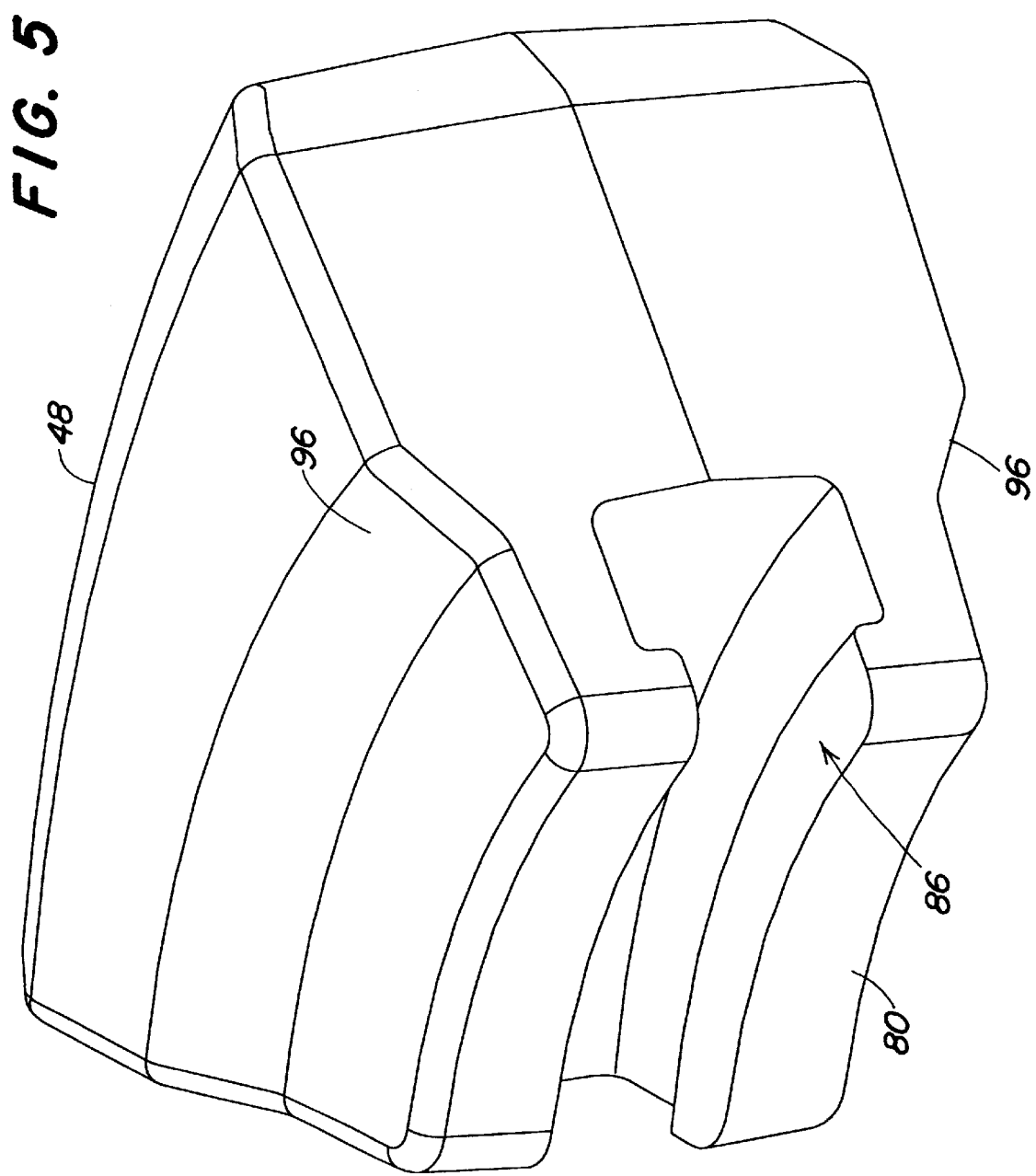

AGRICULTURAL TRACTOR HITCH

FIELD OF THE INVENTION

The present invention relates to a hitch for an agricultural tractor and in particular to a draft link having a recessed pocket on the inboard side thereof and a rotatable wedge shaped bumper that can be moved in the pocket to make adjustments in the amount of permitted sway and/or to compensate for wear of the tractor sway blocks and bumper.

BACKGROUND OF THE INVENTION

An agricultural tractor is a vehicle intended primarily for off-road usage, designed and advertised primarily to supply power to agricultural implements. An agricultural tractor propels itself, provides a force in the direction of travel and provides mechanical, hydraulic and/or electrical power to agricultural implements to enable them to perform their intended functions. A three-point hitch at the rear of an agricultural tractor is commonly used to couple an implement to the tractor to provide the force necessary to move the implement.

The two lower links in a three-point hitch are known as draft links. The draft links are coupled to the tractor through a ball joint at the forward end of each draft link. The ball joints allow the links to be raised and lowered by pivoting vertically about the ball joints and to sway laterally by pivoting left and right about the ball joints. When the draft links are coupled to an implement, both links must move laterally with one another. This lateral movement, or sway, is limited by engagement of the inboard surface of each draft link with a sway block on the side of the tractor frame. Bumpers or pads are commonly fixed to the inboard side of the draft link to contact the sway block on the tractor frame. A separate bumper provides the ability to make adjustments in the amount of sway permitted, as well as to compensate for wear of the engaging components. In addition, bumpers of different sizes can be used to provide a different draft link end spacing for different hitch categories.

Bumpers that are tapered lengthwise of the draft link are known and shown in U.S. Pat. No. 4,470,613. There the bumper is tapered lengthwise of the draft link. The bumper position is adjustable lengthwise of the draft links to permit minor adjustments in the draft link end spacing and to compensate for wear between the bumper and the sway block.

SUMMARY OF THE INVENTION

The draft link of the present invention has a recessed pocket on the inside surface thereof. The recessed pocket has a convex back wall surface which is curved about a center of curvature. A bumper is disposed in the pocket and has a concave inner surface complementary to the convex back wall surface of the pocket. The bumper extends from the pocket and terminates in a convex outer surface. The convex outer surface of the bumper is eccentric to the convex back wall surface of the pocket. As a result, the bumper is wedge shaped, with at least a portion of the convex outer surface extending beyond the pocket, for contact with a sway block on the tractor frame. The bumper is shorter in the longitudinal direction of the draft link than the pocket, allowing the bumper to be rotated in the pocket, about the center of curvature. The position of the bumper in the pocket determines the extent to which the eccentric outer surface projects from the pocket. This determines the amount of lateral sway of the draft link.

BRIEF DESCRIPTION OF THE DRAWINGS

FIG. 5 is a perspective view of the bumper of the present invention.

DESCRIPTION OF THE PREFERRED EMBODIMENT

Figure 1:
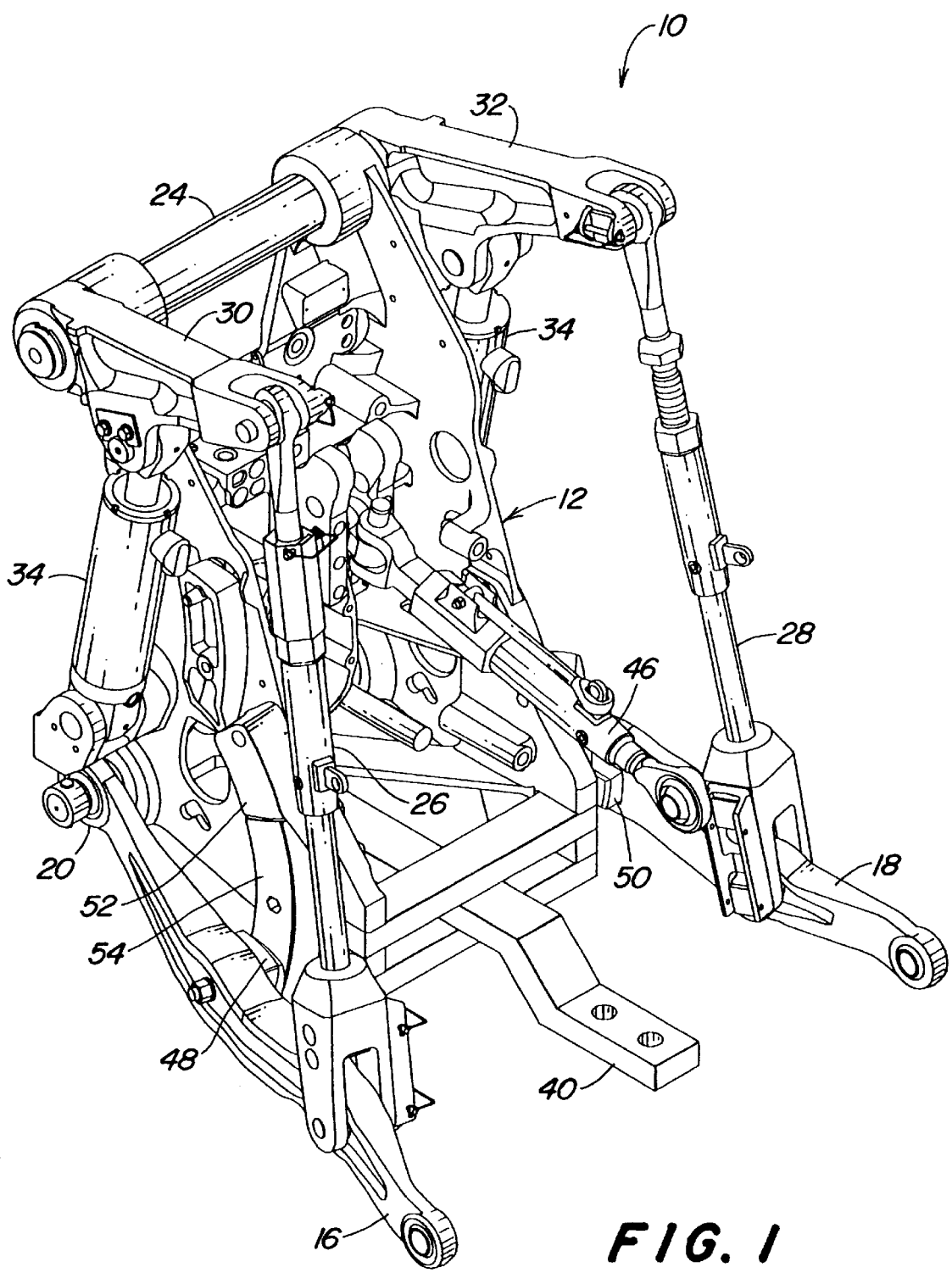
FIG. 1 is a perspective view of the tractor hitch of the present invention.

A tractor hitch assembly is shown in FIG. 1 and designated generally at 10. The hitch 10 includes a housing 12 that is coupled to and integral with a tractor frame, not shown, in a conventional manner for an agricultural tractor. The hitch 10 includes left and right draft links 16, 18 that are universally attached to the housing 12 at their front ends 20 by spherical bearings, i.e. ball joints, in a known manner. The draft links are coupled to a rock shaft 24 via left and right lift links 26, 28 and left and right lift arms 30, 32. Lift cylinders 34, disposed between the lift arms 30, 32 and the housing 12, raise and lower the lift arms, and thereby raise and lower the draft links 16, 18. An upper link 46 is also universally coupled to the housing 12. The upper link 46 and the draft links 16, 18 form the three point hitch 10. A drawbar 40 extends rearward from the housing 12.

Left and right bumpers 48, 50 are mounted to the inboard sides of the draft links 16, 18 and engage left and right sway blocks 52 mounted to the housing 12. Only the left side sway block 52 is shown. Contact between the bumpers 48, 50 and the sway blocks 52 controls the lateral sway of the draft links. The sway blocks 52 wider at their upper ends to prevent sway of the draft links when raised to a transport position but allow sway when the draft links are in lowered positions. A removable lockout 54 is shown in FIG. 1 attached to the lower portion of the sway block 52. Only the left side lockout is shown in FIG. 1. When the lockouts 54 are attached, sway of the draft links is limited in the lowered position of the draft links as well. The sway blocks 52 and the lockouts 54 thus define a sway control surface engaged by the bumpers 48.

Figure 2:
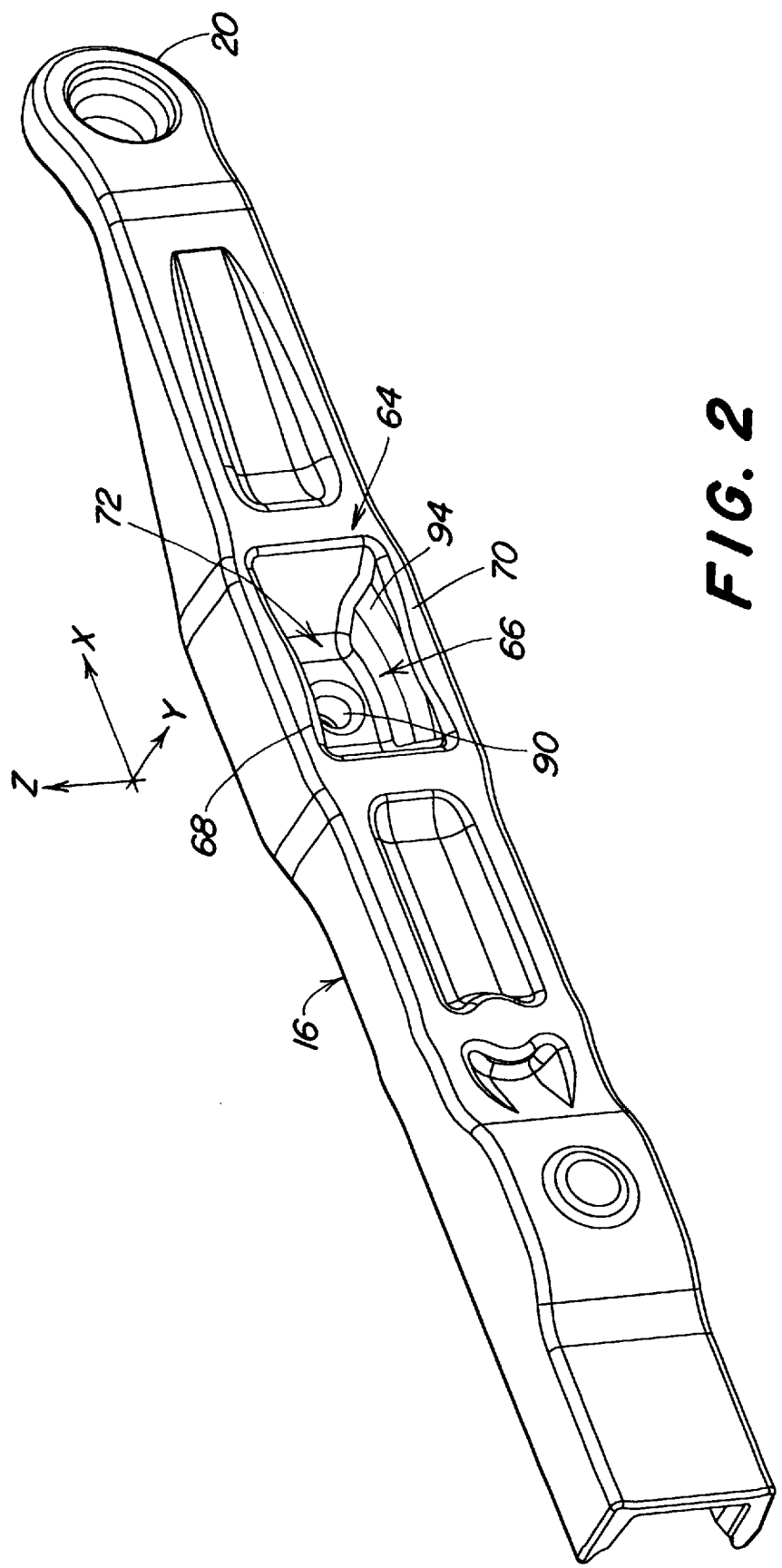
FIG. 2 is a perspective view of one of the draft links of the hitch of the present invention showing the recessed pocket on the inside surface of the draft link.

With reference to FIG. 2, the left draft link 16 is shown in greater detail. The link 16 has a socket at a forward end 20 at which the link is attached to the housing 12 through a spherical bearing. The link has a generally longitudinal direction shown by the reference axis "x", a lateral direction shown by the axis "y" and a vertical direction shown by the axis "z". The longitudinal axis "x" is defined by the length of the draft link 16. Sway of the draft link is motion in the lateral direction "y". The sway is generally in the left and right directions relative to the tractor longitudinal or fore and aft axis, although the draft links are not always aligned longitudinally parallel with the longitudinal axis of the tractor. Vertical motion is accomplished by raising and lowering the rear end of the draft link by rotation about the ball joints at the forward ends 20 of the draft links. The terms vertical, lateral and longitudinal are used to describe the invention and are not to be taken as absolute geo-reference directions nor to limit the scope of the invention.

Figure 4:
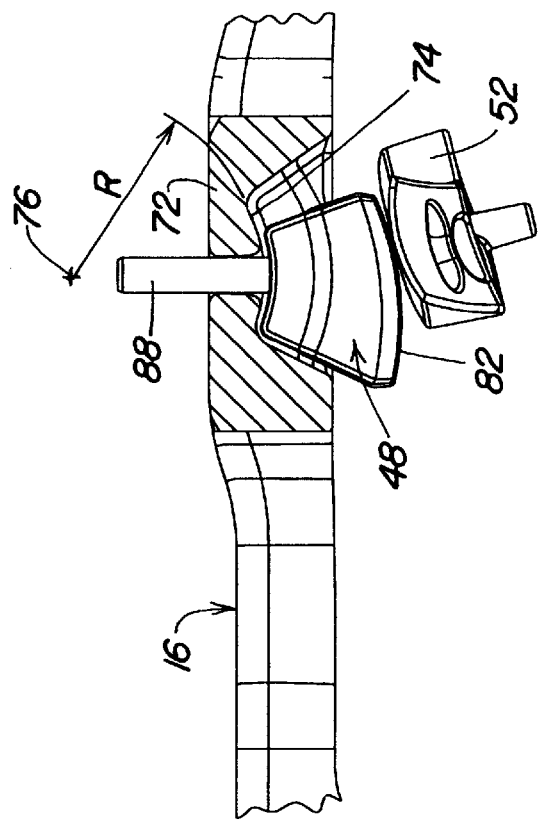
FIG. 4 is a view similar to FIG. 3 illustrating the bumper in another position within the pocket.
Figure 3:
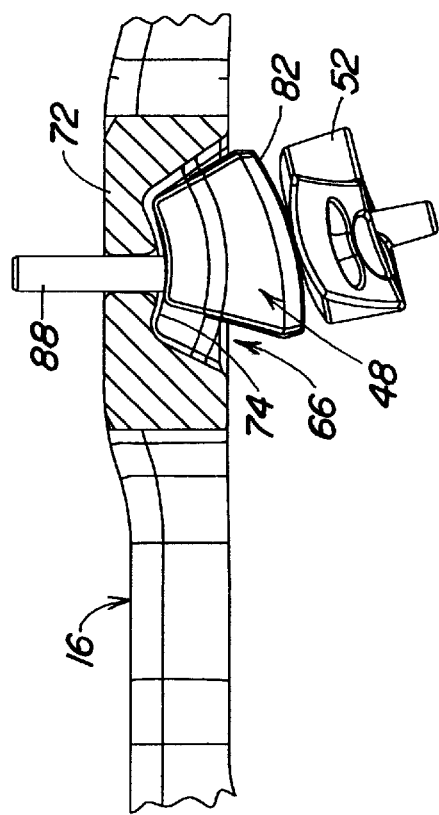
FIG. 3 is a partial sectional view of a draft link illustrating the bumper in the pocket and engaging the sway block mounted to the tractor frame.

The lateral inside surface 64 of the draft link is shown in FIG. 2. The draft link has a recessed pocket 66 in the inside surface. The pocket 66 is defined, in part by an upper wall 68, a lower wall 70 and a back wall 72. The back wall 72 has a surface 74 which is convex as best seen in FIGS. 3 and 4. The back wall surface 74 is convex about a center of curvature 76 shown in FIG. 4. In FIGS. 3 and 4, the bumper 48 is shown in the pocket 66. The bumper inner surface 80 (FIG. 4) is concave and complementary to the convex back wall surface 74 of the pocket. The bumper is shorter in the longitudinal direction of the draft link than is the pocket 66 so that the position of the bumper in the pocket can be varied. In FIG. 3, the bumper is at the forward end of the pocket 66 while in FIG. 4, the bumper is at the rear end of the pocket 66. The bumper extends or projects laterally outward from the pocket and terminates with a convex outer surface 82.

The convex outer surface 82 is eccentric to the convex back wall surface 74 of the pocket. As a result, the bumper is generally wedge shaped. At least a portion of the convex outer surface 82 extends beyond the pocket and engages the sway block 52 as shown in FIGS. 3 and 4. As the bumper is moved from one position to another within the pocket, it rotates about the center of curvature 76. The amount of sway or lateral movement of the draft link will be determined by the position of the bumper within the pocket. When the bumper is located in the pocket in a position where a thicker portion of the bumper contacts the sway block 52, less sway of the draft link will be permitted.

The bumper 48 has a generally T-shaped slot 86 extending into the bumper through the concave inner surface 80 as shown in FIG. 5. The slot 86 receives the square head of a cap screw 88 shown in FIGS. 3 and 4. The cap screw 88 extends through an aperture 90 in the draft link to mount the bumper 48 in the pocket 66. A nut, not shown, is threaded onto the end of the cap screw to fix the bumper in place.

The upper and lower walls 68, 70 of the pocket have inclined portions 94 that engage complementary surface portions 96 of the bumper to hold the bumper vertically within the pocket. These inclined surfaces restrain the bumper from vertical movement relative to the draft link. The vertical loads on the bumper are transmitted directly from the bumper 48 to the draft link, thereby reducing bending loads on the cap screw 88.

The use of the rotating wedge bumper of the present invention eliminates the need to mount the bumper on shims to make adjustment in the amount of draft link sway permitted. The amount of eccentricity between the bumper outer surface 82 and the inner surface 80 generally permits the bumper to be used to make fine adjustments in the sway or to eliminate sway entirely, if desired. To change the end spacing of the draft links for a different hitch category, a bumper having a different lateral thickness may be required in place of the bumper 48.

Having described the preferred embodiment, it will become apparent that various modifications can be made without departing from the scope of the invention as defined in the accompanying claims.

What is claimed is:

1. A hitch for an agricultural tractor comprising:
    a pair of draft links adapted to be mounted on a tractor frame, each draft link having a longitudinal length, a laterally inside surface and a recessed pocket in the inside surface, each recessed pocket having a convex back wall surface having a center of curvature;
    a bumper disposed in each pocket having a concave inner surface complementary to the convex back wall surface of the pocket, the bumper extending from the pocket and terminating in a convex outer surface eccentric to the convex back wall surface of the pocket whereby the bumper is wedge shaped, at least a portion of the convex outer surface extends beyond the pocket, and each bumper is shorter in the longitudinal direction of the link than the pocket wherein the bumper is rotatable in the pocket about the center of curvature; and
    a sway control surface on each side of the tractor frame for engagement by the convex outer surface of the respective bumper to limit lateral motion of the draft links wherein the extent of lateral motion is determined by the position of the bumper in the pocket.

2. The hitch as defined by claim 1 wherein each pocket has upper and lower walls capturing the bumper within the pocket to restrain the bumper from generally vertical movement relative to the link.

* * * * *